United States Patent
Fernando et al.

(10) Patent No.: US 10,112,581 B2
(45) Date of Patent: Oct. 30, 2018

(54) REMOTE CONTROL SYSTEM FOR A VEHICLE

(71) Applicant: FARADAY&FUTURE INC., Gardena, CA (US)

(72) Inventors: Jana Mahen Fernando, Torrance, CA (US); Eric Ryan Evenchick, Los Angeles, CA (US); Anil Paryani, Cerritos, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 0 days.

(21) Appl. No.: 15/417,998

(22) Filed: Jan. 27, 2017

(65) Prior Publication Data

US 2017/0232931 A1    Aug. 17, 2017

Related U.S. Application Data

(60) Provisional application No. 62/289,178, filed on Jan. 29, 2016.

(51) Int. Cl.
*B60R 25/24* (2013.01)

(52) U.S. Cl.
CPC ............ *B60R 25/241* (2013.01); *B60R 25/24* (2013.01); *B60R 2325/101* (2013.01); *B60R 2325/205* (2013.01)

(58) Field of Classification Search
CPC .............................. B60R 25/24; B60R 25/241
See application file for complete search history.

(56) References Cited

U.S. PATENT DOCUMENTS

| 6,834,179 | B2 * | 12/2004 | Bergerhoff | B60R 25/24 455/59 |
|---|---|---|---|---|
| 6,937,141 | B2 | 8/2005 | Muramatsu | |
| 8,847,731 | B2 * | 9/2014 | Tieman | B60R 25/24 340/5.62 |
| 9,002,536 | B2 * | 4/2015 | Hatton | B60R 25/24 701/36 |
| 9,105,182 | B2 * | 8/2015 | Tomita et al. | B60R 25/24 |
| 9,896,090 | B2 * | 2/2018 | Noh | B60R 25/24 |
| 2013/0259232 | A1 * | 10/2013 | Petel | H04L 63/0492 455/411 |
| 2014/0176301 | A1 * | 6/2014 | Fernandez Banares et al. | G07C 9/00015 340/5.26 |
| 2015/0148990 | A1 | 5/2015 | Patel | |
| 2016/0295005 | A1 * | 10/2016 | Schussmann et al. | B60R 25/241 |
| 2016/0304087 | A1 * | 10/2016 | Noh | B60R 25/24 |

* cited by examiner

Primary Examiner — Dale W Hilgendorf
(74) Attorney, Agent, or Firm — Skyler R. Lund

(57) ABSTRACT

A remote control system for a vehicle may include a transponder configured to communicate with a mobile device, and a controller comprising a processing unit. The processing unit may be configured to: receive a control request to perform a vehicle function from the mobile device; receive an authentication signal from the mobile device, the authentication signal being generated by the transponder; and perform the vehicle function based on the authentication signal.

20 Claims, 4 Drawing Sheets

REMOTE CONTROL SYSTEM FOR A VEHICLE

CROSS-REFERENCE TO RELATED APPLICATIONS

This application claims the benefit of U.S. Provisional Application No. 62/289,178, filed on Jan. 29, 2016. The subject matter of the aforementioned application is incorporated herein by reference.

TECHNICAL FIELD

The present disclosure relates generally to a remote control system for a vehicle, and more particularly, to a mobile device and transponder based remote control system for a vehicle.

BACKGROUND

Vehicles are often controlled remotely. Original equipment manufacturers (OEMs) commonly install software in vehicles that communicates with a transponder (e.g., a key fob) providing a user remote access to the vehicle. For example, the key fob may allow the user to wirelessly unlock doors and/or start the vehicle when in proximity. The key fob may provide convenience to the user in allowing access to vehicle controls without being physically within the vehicle, but the remote access is limited in range and functionality.

Recent technology advancements have increased wireless connectivity through mobile devices, such as smart phones, tablets, and personal computers. The mobile devices provide nearly unlimited range and access over any number of objects and systems, for example, through designated software applications (e.g., apps). However, sometimes the mobile device cannot be entrusted with sensitive data required to control vehicle operations. First, the mobile devices are designed for general purpose functions and lack the necessary security features. Second, the mobile devices may be designed and manufactured by a third party, and thus the vehicle maker cannot ensure that the mobile device is secure. It would be desirable to increase the connectivity of vehicles while maintaining security.

The disclosed remote control system is directed to mitigating or overcoming one or more of the problems set forth above and/or other problems in the prior art.

SUMMARY

One aspect of the present disclosure is directed to a remote control system for a vehicle. The remote control system may include a transponder configured to communicate with a mobile device; and a controller including a processing unit. The processing unit may be configured to: receive a control request to perform a vehicle function from the mobile device; receive an authentication signal from the mobile device, the authentication signal being generated by the transponder; and perform the vehicle function based on the authentication signal.

Another aspect of the present disclosure is directed to a method of remote control for a vehicle. The method may include: receiving, by a controller, a control request to perform a vehicle function from a mobile device, the mobile device being in communication with a transponder; receiving, by the controller, an authentication signal from the mobile device, the authentication signal being generated by the transponder; and performing the vehicle function based on the authentication signal.

Yet another aspect of the present disclosure is directed to a non-transitory computer-readable medium storing instructions which, when executed, cause one or more processors to perform a method of remote control of a vehicle. The method may include: receiving a control request to perform a vehicle function from a mobile device, the mobile device being in communication with a transponder; receiving an authentication signal from the mobile device, the authentication signal being generated by the transponder; and performing the vehicle function based on the authentication signal.

DETAILED DESCRIPTION

The disclosure is generally directed to a remote control system that may increase connectivity to a vehicle while maintaining security. In some embodiments, the remote control system may include a transponder (e.g., a key fob), a mobile device (e.g., a smart phone), and a controller on-board a vehicle. The transponder may be configured to generate an authentication signal and communicate with the mobile device over a short-range network. The mobile device may be configured to transmit a control request to the controller to perform a vehicle function (e.g., starting the vehicle) over a long-range network. The vehicle function may also include transmission of data and/or conditions acquired by vehicle sensors to the transponder and/or mobile device. In some embodiments, the remote control system may be configured to perform a challenge-response authentication protocol to verify the control request of the mobile device.

Figure 1:
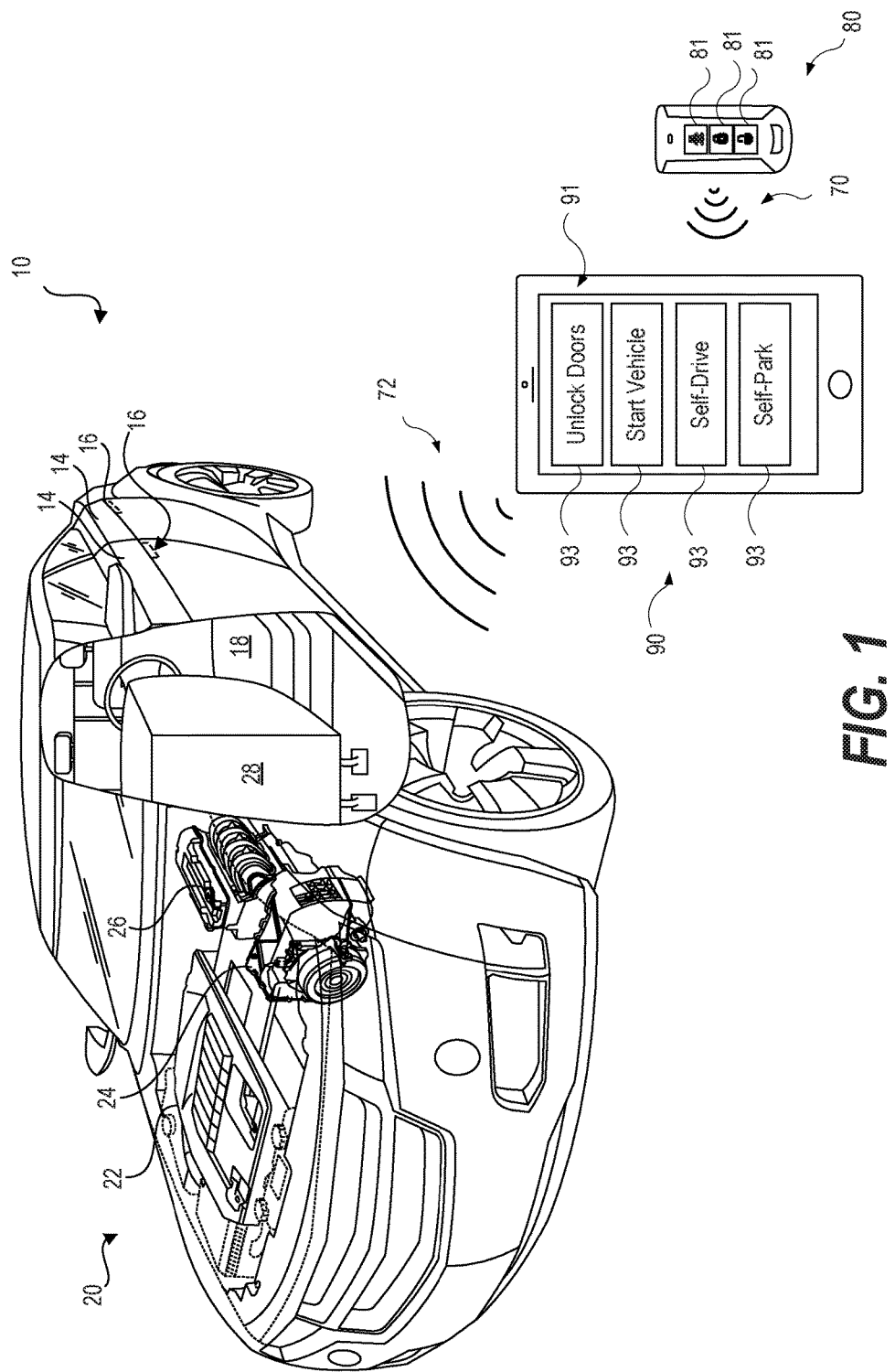
FIG. 1 is a diagrammatic illustration of an exemplary embodiment of an exemplary vehicle, according to an exemplary embodiment of the disclosure.

FIG. 1 is a diagrammatic illustration of an exemplary embodiment of an exemplary vehicle 10. Vehicle 10 may have any body style, such as a sports car, a coupe, a sedan, a pick-up truck, a station wagon, a sports utility vehicle (SUV), a minivan, or a conversion van. Vehicle 10 may be an electric vehicle, a fuel cell vehicle, a hybrid vehicle, or a conventional internal combustion engine vehicle. Vehicle 10 may be configured to be operated by a driver occupying vehicle 10, remotely controlled, and/or autonomously. As illustrated in FIG. 1, vehicle 10 may include a plurality of doors 14 that may allow access to a cabin 18, and each door 14 may be secured with respective locks 16.

Figure 2:
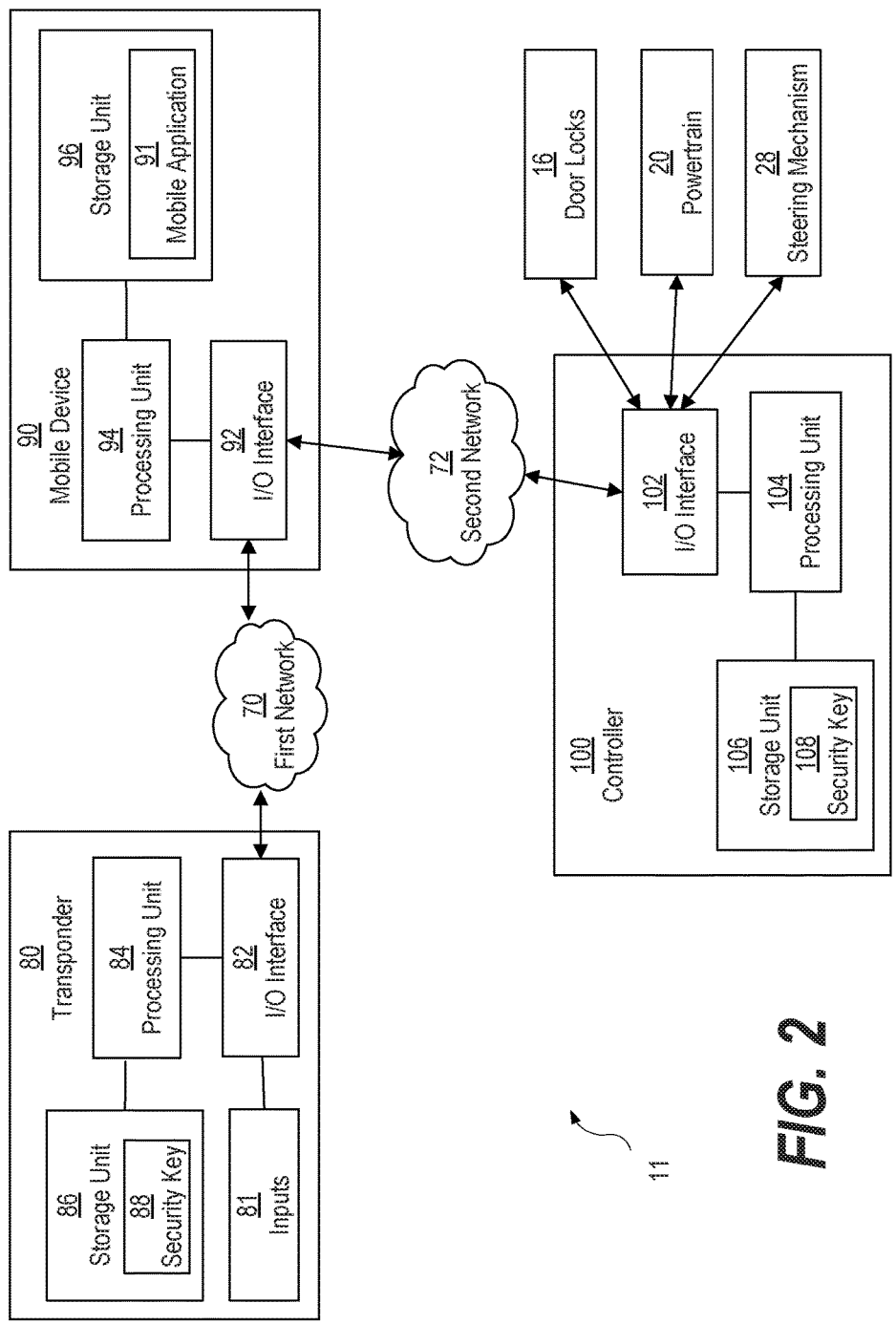
FIG. 2 is a block diagram of an exemplary remote control system that may be used for the exemplary vehicle of FIG. 1, according to an exemplary embodiment of the disclosure.

Vehicle 10 may also include a powertrain 20 having a power source 22, a motor 24, and a transmission 26. In some embodiments, power source 22 may be configured to output power to motor 24, which drives transmission 26 to generate kinetic energy through wheels of vehicle 10. Power source 22 may also be configured to provide power to other components of vehicle 10, such as audio systems, user interfaces, heating, ventilation, air conditioning (HVAC), etc. Power source 22 may include a plug-in battery or a hydrogen fuel-cell. It is also contemplated that, in some embodiments, powertrain 20 may include or be replaced by a conventional internal combustion engine. Each of the components of powertrain 20 may be remotely controlled and/or perform autonomous functions, such as self-drive, self-park, and self-retrieval, through communication with a controller 100 (as depicted in FIG. 2).

Vehicle 10 may further include a steering mechanism 28. In some embodiments, steering mechanism 28 may include a steering wheel, a steering column, a steering gear, and a tie rod (not shown). For example, the steering wheel may be rotated by an operator, which in turn rotates the steering column. The steering gear may then convert the rotational movement of the steering column to lateral movement, which turns the wheels of vehicle 10 by movement of the tie rod. Each of the components of steering mechanism 28 may also be remotely controlled and/or perform autonomous functions, such as self-drive, self-park, and self-retrieval, through communication with controller 100.

Vehicle 10 may even further include a plurality of sensors functionally associated with its components, such as powertrain 20 and steering mechanism 28. For example, the sensors may monitor and record parameters such as speed and acceleration of vehicle 10, stored energy of power source 22, operation of motor 24, and function of steering mechanism 28. Vehicle 10 may also include cabin sensors, such as cameras and weight sensors, configured to acquire parameters of the occupants of cabin 18. The data from the sensors may be aggregated and processed according to software, algorithms, and/or look-up tables to determine conditions of vehicle 10. For example, the cameras may acquire data indicative of the identities of the occupants when an image is processed with image recognition software. The data may also indicate whether predetermined conditions of vehicle 10 are occurring or have occurred, according to algorithms and/or look-up tables. For example, controller 100 may process the data from the sensors to determine conditions, such as an unattended child left in vehicle 10, vehicle 10 being operated recklessly or by a drunken driver, and/or occupants not wearing a seat belt. The data and conditions may be processed by controller 100 to generate appropriate control signals. The control signals may be transmitted remotely, for example, to a transponder 80 over a first network 70 and/or a mobile device 90 over a second network 72. In some embodiments, vehicle 10 may also be remotely controlled by transponder 80 over first network 70 and/or mobile device 90 over second network 72.

First network 70 and second network 72 may be a number of different types of wired and wireless networks. In some embodiments, first network 70 may include a short-range network and enable two-way communication between transponder 80 and mobile device 90 and/or controller 100, and second network 72 may include a long-range network and enable two-way communication between mobile device 90 and controller 100.

In some embodiments, first network 70 may include structures enabling radiofrequency (RF) communication. For example, in some embodiments, first network 70 may include a Bluetooth™ network enabling communication when transponder 80 is paired with mobile device 90 and/or controller 100. For instance, the Bluetooth™ network may provide a piconet that enables connection over one or more predetermined RF channels when transponder 80 is within proximity of mobile device 90 and/or controller 100 (e.g., within about 10 meters). When the piconet connection is established, transponder 80 may continually transfer data with mobile device 90 and/or controller 100, including an authentication signal and/or a command signal generated in response to inputs 81. In some embodiments, first network 70 may include a Bluetooth Low Energy™ network, for example, enabling transmission of low-powered signals over RF channels having 2 MHz of bandwidth.

In some embodiments, first network 70 may include near field communication (NFC) allowing transponder 80 to share data with mobile device 90 when within a close proximity (e.g., within about 10 centimeters). For example, transponder 80 and mobile device 90 may not communicate unless transponder 80 is in physical contact with or in the vicinity of mobile device 90. The NFC of first network 70 may be either passive or active. For example, in embodiments of a passive NFC, mobile device 90 may be an initiator device and transponder 80 may be a target device, such that transponder 80 may draw its power from an electromagnetic field generated by mobile device 90, or vice versa. The passive network may allow transponder 80 to be manufactured without a power source and be designed as a seamless structure of any ornamental shape and size. The passive network may also enable transponder 80 to be housed within structures, such as a separable casing (not shown) for mobile device 90. It is contemplated that transponder 80 may communicate with controller 100 over the same first network 70 used to communicate with mobile device 90, or over another short-range network (not shown) different from first network 70. For example, transponder 80 may communicate with mobile device 90 over a first predetermined RF frequency and may communicate with controller 100 over a second predetermined RF frequency.

Second network 72 may include a number of different types of networks enabling communication between mobile device 90 and controller 100. In some embodiments, mobile device 90 may be configured to communicate with controller 100 over one or more of a nationwide cellular network and/or a local wireless network (e.g., Bluetooth™, WiFi, and/or LoFi). For example, second network 72 may include a long-range cellular network and/or wireless Internet network enabling remote communication between mobile device 90 and controller 100. Second network 72 may also include a WiFi network generated by controller 100, enabling communication when mobile device 90 and controller 100 are within proximity. The diverse structures of second network 72 may enhance the range of connectivity of vehicle 10, while also increasing control through the amount of data that can be displayed by a graphical user interface (GUI) of mobile device 90.

Transponder 80 may be any structure configured to generate and transmit a wireless signal to vehicle 10. For example, transponder 80 may be configured to transmit an authentication signal to vehicle 10 over RF communication (e.g., first network 70) to activate vehicle functions based on an authorized user. In some embodiments, transponder 80 may also include one or more inputs 81 configured to be actuated by the authorized user to transmit an authentication signal and/or a command signal to vehicle 10. For example, transponder 80 may include a first input 81 to unlock door 14, a second input 81 to lock door 14, and a third input 81 to turn on power source 22. Transponder 80 may be configured to generate and transmit authentication and/or command signals based on a single actuation or sequential actuations of one or more inputs 81. For example, in some embodiments, transponder 80 may be configured to unlock a first door 14 by actuating input 81 once, and unlock a plurality of doors 14 by actuating input 81 twice. In some embodiments, transponder 80 may be configured to generate the authentication signal based on additional security features. For example, transponder 80 may require input of a passcode (e.g., a PIN) to ensure that the transponder 80 is in the possession of an authenticated user. In some embodiments, the passcode may be input by sequentially actuating one or more inputs 81 on transponder 80. Inputs 81 may include buttons and/or touch-sensitive surfaces, and may also be configured to detect biometric data to ensure possession of an authenticated user. In embodiments where first network 70 is a short-range network, transponder 80 may only be configured to communicate with controller 100 when within a certain proximity.

In some embodiments, transponder 80 may automatically communicate with controller 100 when within a certain proximity. For example, in some embodiments, transponder 80 may continuously transmit the authentication signal and/or the command signal, for example, such that controller 100 may automatically perform a vehicle function (e.g., unlock door 14 or start vehicle 10) based on transponder 80 being within a proximity of controller 100. In some embodiments, transponder 80 may automatically generate and transmit the authentication signal and/or the command signal in response to a request (e.g. a challenge) from controller 100. Accordingly, transponder 80 may be provided without an input mechanism. For example, transponder 80 may be formed of a seamless structure of any ornamental shape and size. In some embodiments, transponder 80 may be a medallion. It is also contemplated that transponder 80 may be housed within other structures, such as a separable casing (not shown) for mobile device 90. In some embodiments, transponder 80 may not include an internal power source, but instead be powered by an external energy source, such as by mobile device 90, or by solar power. It is further contemplated that transponder 80 may be configured to generate and transmit a signal to mobile device 90 over first network 70, and mobile device 90 may be configured to transmit the signal to vehicle 10 over second network 72 in a method of controlling functions of vehicle 10.

Mobile device 90 may be any device configured to transmit and receive data to and from transponder 80 and/or controller 100. Mobile device 90 may include a smart phone, a tablet, a personal computer, and/or a wearable device, such as smart glass or an iWatch™. Mobile device 90 may include a display that depicts a graphical user interface of a mobile application 91. In some embodiments, mobile application 91 may provide inputs 93 that enable users to control a number of different functions of vehicle 10. For example, mobile application 91 may display inputs 93 that enable unlocking doors 14, starting vehicle 10, self-drive of vehicle 10, and/or self-parking of vehicle 10. Mobile application 91 may also provide additional GUIs that enable more advanced controls over functions of vehicle 10. For example, mobile application 91 may provide maps, GPS data, vehicle entertainment data, vehicle control data, vehicle performance data, and/or data from vehicle sensors. It is also contemplated the mobile application 91 may be configured to control an HVAC system of vehicle 10, enable cameras inside of cabin 18, access media of vehicle 10, and/or control an auto-pilot of vehicle 10. In some embodiments, mobile application 91 may be configured to receive other types of inputs 93 that do not require touching the screen of mobile device 90, such as voice commands and/or body gestures (e.g., hand and/or facial expressions). It is also contemplated that inputs 93 may include a touch-sensitive surface, a stylet, a keyboard, buttons, a mouse, and/or a pointer. In some embodiments, mobile application 91 may be configured to detect the identity of a user through biometric data such as fingerprints, or facial scanning and recognition software. Mobile application 91 may also be configured to automatically generate notifications (e.g., push notifications) related to data from the sensors of vehicle 10.

FIG. 2 is a block diagram of an exemplary remote control system 11 that may be used for vehicle 10 of FIG. 1, according to an exemplary embodiment of the disclosure. As illustrated in FIG. 2, remote control system 11 may include controller 100 having, among other things, an I/O interface 102, a processing unit 104, and a storage unit 106. In some embodiments, a security key 108 may be stored in storage unit 106. One or more of the components of controller 100 may be included in an on-board computer of vehicle 10. These units may be configured to transfer data and send or receive instructions between or among each other.

I/O interface 102 may also be configured for two-way communication between controller 100 and various components of remote control system 11, such as door locks 16, powertrain 20, and steering mechanism 28 via communication cables, wireless networks, or other communication mediums. I/O interface may also send and receive operating signals to and from transponder 80 and mobile device 90 through at least one of first network 70 and/or second network 72. Processing unit 104 may be configured to receive and process signals to determine a plurality of conditions of the operation of vehicle 10. Processing unit 104 may also be configured to generate and transmit command signals, via I/O interface 102, in order to actuate the devices in communication. For example, processing unit 104 may be configured to unlock/lock door locks 16, control components of powertrain 20, and operate steering mechanism 28. Processing unit 104 may also be configured to receive and process data from sensors.

As also depicted in FIG. 2, transponder 80 may include one or more inputs 81, an I/O interface 82, a processing unit 84, and a storage unit 86. Processing unit 84 may be configured to generate and transmit signals, via I/O interface 82, to and from mobile device 90 and/or controller 100. Processing unit 84 may also be configured to access data of storage unit 86, such as a security key 88, to generate the signals. Storage unit 86 may be a secure storage device to prevent unauthorized access. In some embodiments, processing unit 84 may be configured to generate and transmit an authentication signal based on security key 88, which enables encrypted communication with controller 100. Processing unit 84 may also be configured to verify an authentication signal received from other components, such as controller 100 in a mutual challenge-response protocol. Processing unit 84 may also be configured to generate a signal based on actuation of inputs 81. For example, processing unit 84 may be configured to generate and transmit a signal to controller 100 in order to unlock/lock door locks 16, turn on power source 22, and/or operate steering mechanism 28.

Security keys 88, 108 may be installed in each of storage unit 86, 106 and enable encrypted communication. Security keys 88, 108 may be secret or public depending on the encryption protocol. In some embodiments, security keys 88, 108 may be identical, secret functions or passcodes that may allow communication between transponder 80 and controller 100 without transmitting security keys 88, 108. In some embodiments, security keys 88, 108 may include a synchronized clock or pseudo-number generator that rotates through various passcodes produced by a cryptographic algorithm. For example, the synchronized clock may enable communication after instantaneously comparing a passcode of each security keys 88, 108. In some embodiments, security keys 88, 108 may be used in a challenge-response protocol, as exemplified in FIG. 4. Since security keys 88, 108 is only known to transponder 80 and controller 100, and not accessible by mobile device 90, remote control system 11 may enable wireless communication between components 80, 100 without unauthorized access and control of the functions of vehicle 10.

Mobile device 90 may include an I/O interface 92, a processing unit 94, and a storage unit 96. Processing unit 94 may be configured to generate and transmit signals, via I/O interface 92, to and from transponder 80 and controller 100. Processing unit 94 may be configured to access data of storage unit 96, such as mobile application 91, to generate the signals. Mobile application 91 may provide instructions to generate a GUI, as exemplified in FIG. 1. The GUI may display one or more inputs 93 (as depicted in FIG. 1) that may be actuated to control functions of vehicle 10. In some embodiments, mobile device 90 may be a general functioning device (e.g., a smart phone) and only be enabled to access data and direct processes of controller 100 when mobile device 90 is paired with transponder 80.

Figure 3:
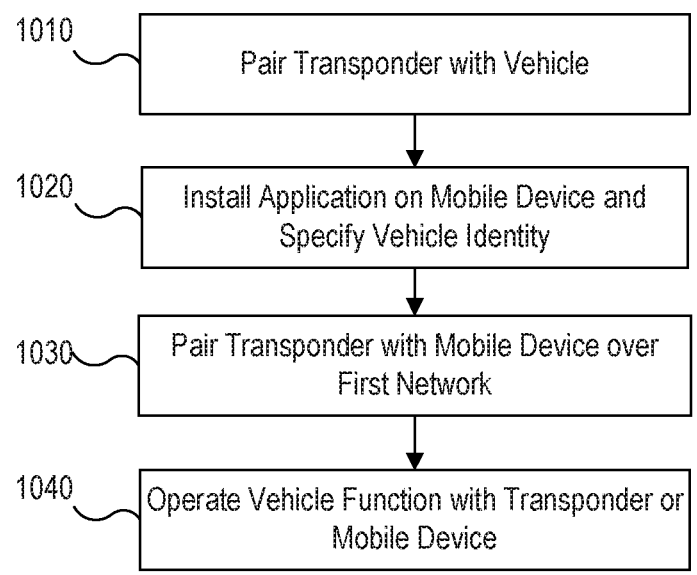
FIG. 3 is a flowchart illustrating an exemplary process that may be performed by the exemplary remote control system of FIG. 2, according to an exemplary embodiment of the disclosure.

FIG. 3 provides a flowchart illustrating an exemplary configuration method 1000 that may be performed by remote control system 11 of FIG. 2.

Step 1010 may include pairing transponder 80 with vehicle 10. The pairing of Step 1010 may include installing or storing security key 108 in storage unit 106 of controller 100 and security key 88 in storage unit 86 of transponder 80. Security key 88 and security key 108 may be identical and may enable encrypted communication between transponder 80 and controller 100. In some embodiments, the pairing may be setup by an OEM when initially manufacturing vehicle 10 and/or transponder 80. In some embodiments, the pairing may be setup after the initially manufacturing of vehicle 10, such as when transponder 80 is produced by third party manufacturers other than the OEM.

Step 1020 may include installing mobile application 91 on mobile device 90 and specifying vehicle identity. For example, mobile device 90 may download and install the mobile application 91 from a server through a network (e.g., second network 72). Mobile application 91 may prompt the user to provide a vehicle identification number (VIN) of vehicle 10 in order to configure mobile device 90 to communicate with controller 100. Step 1020 may include additional security steps, such as requiring personal information (e.g., a PIN and/or biometric information) of an owner of vehicle 10. After Step 1020, mobile application 91 may be configured to send and receive signals to and from controller 100 through second network 72. However, controller 100 may not allow mobile application 91 to control and/or access data unless authenticated, for example, by transmission of an authentication signal generated by transponder 80.

Step 1030 may include pairing transponder 80 with mobile device 90 over first network 70. In some embodiments, transponder 80 may be paired with mobile device 90 over a short-range network, such as Bluetooth™ and/or NFC. The initial pairing of Step 1020 may require security measures of inputting a PIN and/or depiction of a random screen that ensures concurrent possession of both transponder 80 and mobile device 90. The pairing of Step 1030 may enable exchange of data between transponder 80 and mobile device 90 whenever both devices are within a proximity. For example, mobile device 90 may automatically connect to transponder 80 over a Bluetooth™ network when mobile device 90 detects presence of transponder 80 over the network. Transponder 80 may generate and transmit an authentication signal to mobile device 90 when components 80, 90 are connected to first network 70. In some embodiments, the pairing of Step 1030 may also enable a magnetic field generated by mobile device 90 to provide power to transponder 80, or vice versa.

Step 1040 may include operating a vehicle function with transponder 80 or mobile device 90. In some embodiments, a user may operate a vehicle function by actuating inputs 81 of transponder 80 that generates a command signal. The command signal may be transmitted over network 70 directly to vehicle 10, or to vehicle 10 via mobile device 90. In some embodiments, a user may control vehicle functions by actuating input 93 of mobile application 91 when mobile device 90 receives an authentication signal from transponder 80. In some embodiments, a user may control vehicle functions by actuating input by actuating inputs 81 when within proximity of mobile device 90. Step 1040 may also include accessing data from vehicle 10 from transponder 80 or mobile device 90.

Figure 4:
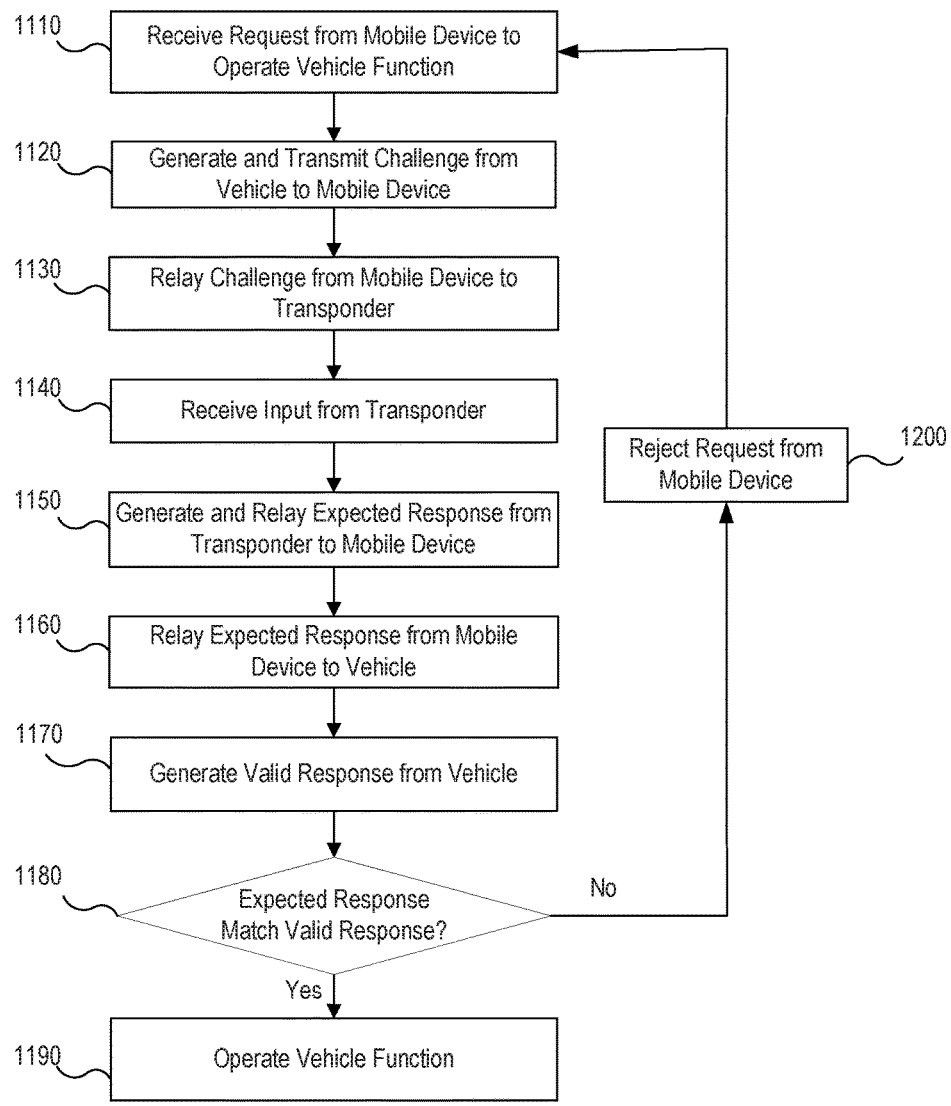
FIG. 4 is a flowchart illustrating another exemplary process that may be performed by the exemplary remote control system of FIG. 2, according to an exemplary embodiment of the disclosure.

FIG. 4 provides a flowchart of an exemplary method 1100 of operating a vehicle function with mobile device 90 through a challenge-response protocol. In some embodiments, method 1100 may be performed by remote control system 11 of FIG. 2.

In Step 1110, controller 100 may receive a control request from mobile device 90 to perform a vehicle function. For example, a user may actuate inputs 93 in order to unlock door 14, turn on power source 22, and/or perform autonomous functions through mobile application 91. The vehicle function may also include a query of a condition of vehicle 10. For example, the vehicle function may also include a query of sensor data, such as a GPS location of vehicle 10, instantaneous speed of vehicle 10, and/or a determination of the occupants via interior cameras. Mobile device 90 may transmit the control request over second network 72 to controller 100. In some embodiments, Step 1110 may be omitted. For example, method 1100 may be performed to automatically generate notifications (e.g., push notifications) on transponder 80 and/or mobile device 90 indicative of data and/or conditions from vehicle 10. For example, upon detection of a child in vehicle 10 left unattended, controller 100 may automatically initiate Step 1120.

In Step 1120, controller 100 may generate and transmit a challenge from vehicle 10 to mobile device 90. In some embodiments, the challenge may be based on security key 88, 108 stored in each of transponder 80 and controller 100. For example, security key 88, 108 may include a function, such as $f(x)$, only known to transponder 80 and controller 100. The challenge may include a random value, X, which is generated and transmitted by controller 100 to mobile device 90. In some embodiments, controller 100 may transmit the challenge to mobile device 90 over second network 72 (e.g., a cellular network). Controller 100 may generate a new and unique challenge for every control request to reduce chances of unauthorized access.

In Step 1130, mobile device 90 may relay the challenge to transponder 80. For example, mobile device 90 may receive the challenge from controller 100 over second network 72, and relay the challenge to transponder 80 over first network 70. Mobile device 90 may relay the challenge without altering or recording the challenge. Mobile device 90 may also not have access to the encryption because mobile device 90 does not have access to security keys 88, 108.

In Step 1140, remote control system 11 may receive input from transponder 80. For example, inputs 81 of transponder 80 may be actuated by a user to generate a signal. Step 1140 may provide one or more additional layers of security by requiring an actuation of transponder 80. For example, step 1140 may include actuation of inputs 81 to ensure physical possession of transponder 80 in order to protect access and control of vehicle 10 even after unauthorized access of security keys 88, 108. Step 1140 may additionally require a PIN based on sequential actuation of one or more inputs 81. Step 1140 may, additionally or alternatively, be based on biometric data, such as detection of a fingerprint on a surface of transponder 80 and/or mobile device 90. However, in some embodiments, Step 1140 may be omitted.

In Step 1150, transponder 80 may generate and transmit an expected response to mobile device 90. For example, in some embodiments, security key 88 may include a function, $f(x)$, identical to the function of security key 108. After receiving the random value, X, of the challenge, transponder may calculate the function based on the random value, $f(X)$, to generate the expected response. The expected response may provide an authorization signal, verifying that transponder 80 includes security key 88 identical to security key 108 of controller 100. Transponder 80 may then transmit the expected response to mobile device 90 over first network 70.

In Step 1160, mobile device 90 may relay the expected response to vehicle 10. For example, mobile device 90 may receive the expected response from transponder 80 over first network 70, and relay the challenge to controller 100 over second network 72. Mobile device 90 may relay the challenge without altering or recording the expected response. Again, mobile device 90 may not have access to the encryption because mobile device 90 does not have access to security keys 88, 108.

In Step 1170, controller 100 may generate a valid response. The valid response may be determined by inputting the random value, X, of the challenge, into the function, $f(x)$, of the security key 108. For example, the valid response may be $f(X)$.

In Step 1180, controller 100 may determine whether the expected response matches the valid response. If there is no match between the expected response and the valid response, controller 100 may reject the request from mobile device 90 in Step 1200 and return to Step 1110. However, if the expected response matches the valid response, controller 100 may proceed to Step 1190 to operate the vehicle function of the request from mobile device 90. For example, controller 100 may unlock doors 14, according to a control request of Step 1110, only based on receipt of a valid authentication signal of Step 1150. Controller 100 may also generate and/or transmit data of sensors to mobile device 90. For example, controller 100 may generate an automatic notification of data and/or a condition from vehicle 10, for example, notifying a user that a child has been left unattended in vehicle 10.

Even though exemplary method 1100 is discussed regarding a one-way challenge-response protocol, it is contemplated that method 1100 may also be performed with a mutual challenge-response protocol requiring a two-way authentication. For example, each of transponder 80 and controller 100 may transmit a challenge and function incorporating security key 88, 108, which need to be responded by respective components 80, 100. It is also contemplated, that method 1100 may be performed with other encryption protocols, such as synchronized clocks or pseudo-number generators.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed remote control system and related methods. Other embodiments will be apparent to those skilled in the art from consideration of the specification and practice of the disclosed remote control system and related methods. It is intended that the specification and examples be considered as exemplary only, with a true scope being indicated by the following claims and their equivalents.

What is claimed is:

1. A remote control system for a vehicle, the remote control system comprising:
   a transponder configured to communicate with a mobile device; and
   a controller comprising a processing unit configured to:
      detect a condition from the vehicle;
      generate a notification in response to the detected condition;
      transmit the notification to the mobile device;
      receive an authentication signal from the mobile device in response to the notification, the authentication signal being generated by the transponder; and
      perform a vehicle function based on the authentication signal.

2. The remote control system of claim 1,
   wherein the transponder is configured to communicate with the mobile device over a short-range wireless network, and
   wherein the controller is configured to communicate with the mobile device over a long-range wireless network.

3. The remote control system of claim 2,
   wherein the short-range wireless network comprises near field communication, and
   the long-range wireless network includes a cellular network.

4. The remote control system of claim 1, wherein the transponder is paired with the controller based on a security key stored in the transponder and the controller.

5. The remote control system of claim 4, wherein the security key is not accessible to the mobile device.

6. The remote control system of claim 1, wherein the processing unit is further configured to generate a challenge, the challenge being transmitted to the transponder by way of the mobile device, and the authentication signal being an expected response to the challenge.

7. The remote control system of claim 6, wherein the processing unit is further configured to determine a valid response to the challenge.

8. The remote control system of claim 7, wherein the processing unit is further configured to compare the expected response to the valid response, and perform the vehicle function based on the expected response matching the valid response.

9. The remote control system of claim 1, wherein the transponder further includes an input, and wherein the performing the vehicle function is based on an actuation of the input.

10. The remote control system of claim 1, wherein the vehicle function includes at least one of turning the vehicle on, unlocking a door, operating a powertrain, or operating a steering column of the vehicle.

11. A method of remote control for a vehicle, the method comprising: a controller of the vehicle
    detecting a condition from the vehicle;
    generating a notification in response to the detected condition;
    transmitting the notification to a mobile device;
    receiving an authentication signal from the mobile device in response to the notification, the authentication signal being generated by a transponder; and
    performing the vehicle function based on the authentication signal.

12. The method of claim 11,
    wherein the transponder is configured to communicate with the mobile device over a short-range wireless network, and
    wherein the controller is configured to communicate with the mobile device over a long-range wireless network.

13. The method of claim 12, wherein the short-range wireless network comprises near field communication, and the long-range wireless network includes a cellular network.

14. The method of claim 11, further including pairing the transponder with the controller based on a security key stored in the transponder and the controller.

15. The method of claim 14, further including preventing access of the mobile device to the security key.

16. The method of claim 11, further including:
    generating, by the controller, a challenge; and
    transmitting the challenge to the transponder by way of the mobile device, and the authentication signal being an expected response to the challenge.

17. The method of claim 16, further including determining, by the controller, a valid response to the challenge.

18. The method of claim 17, further including comparing, by the controller, the expected response to the valid response, and performing the vehicle function based on the expected response matching the valid response.

19. The method of claim 11, wherein the performing the function includes at least one of turning the vehicle on, unlocking a door, operating a powertrain, or operating a steering column of the vehicle.

20. A non-transitory computer-readable medium storing instructions which, when executed, cause one or more processors to perform a method of remote control of a vehicle, the method comprising:
    detecting a condition from the vehicle;
    generating a notification in response to the detected condition;
    transmitting the notification to a mobile device;
    receiving an authentication signal from the mobile device in response to the notification, the authentication signal being generated by the transponder; and
    performing the vehicle function based on the authentication signal.

* * * * *